Figure 1:
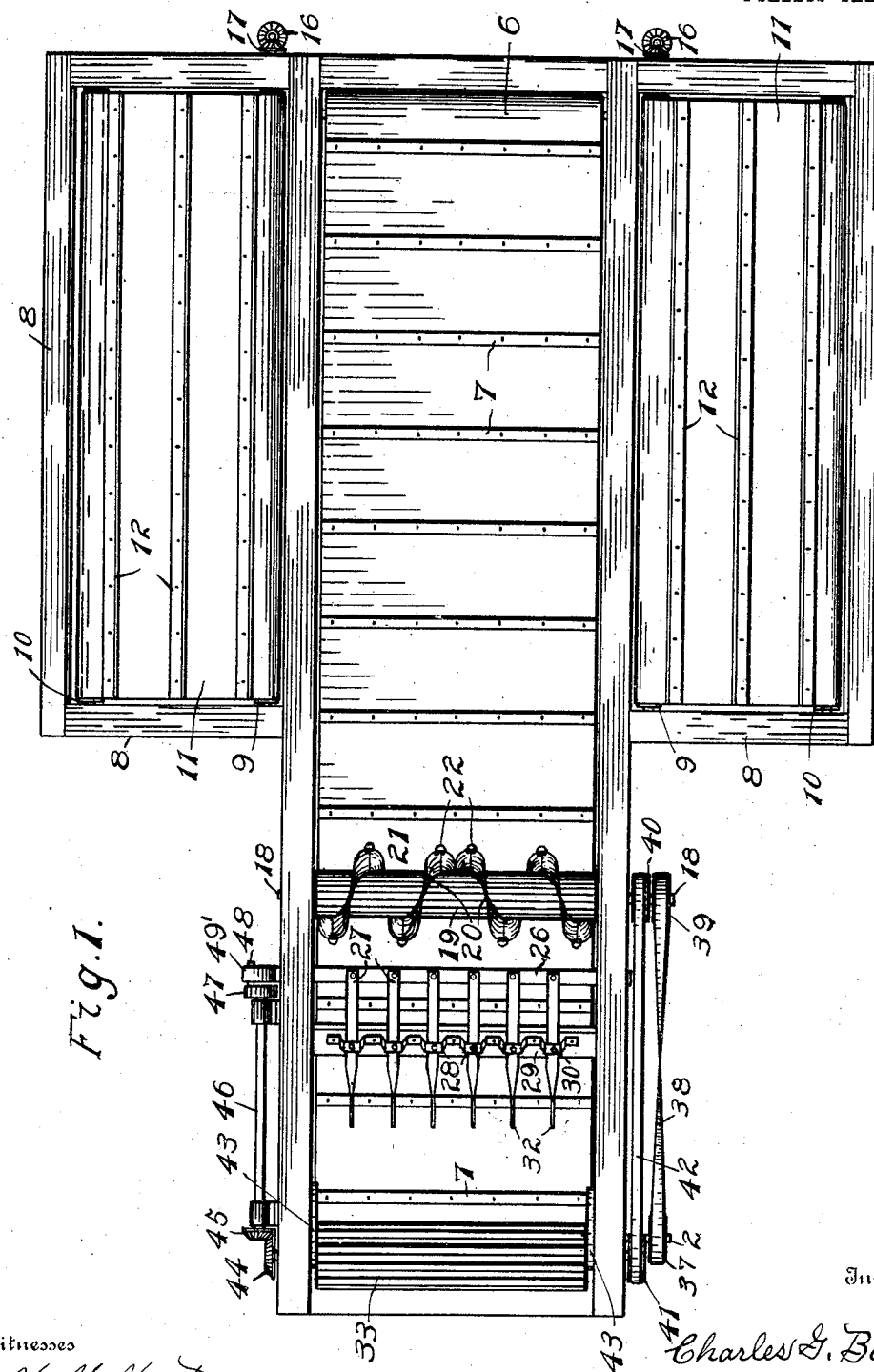

No. 785,398. PATENTED MAR. 21, 1905.
C. G. BORT.
BAND CUTTER AND FEEDER FOR CORN SHREDDERS.
APPLICATION FILED NOV. 4, 1903.

2 SHEETS—SHEET 1.

Witnesses
H. H. Hunt.
J. L. Weaver

Inventor
Charles G. Bort,
By Walter N. Haskell,
Attorney

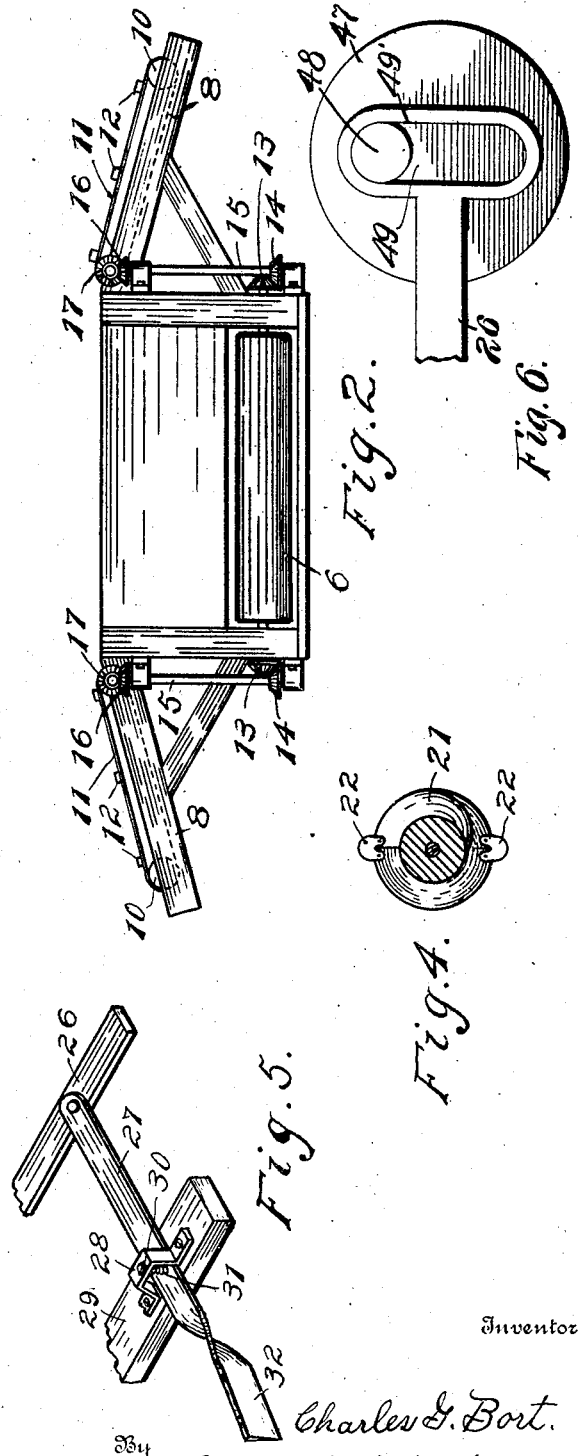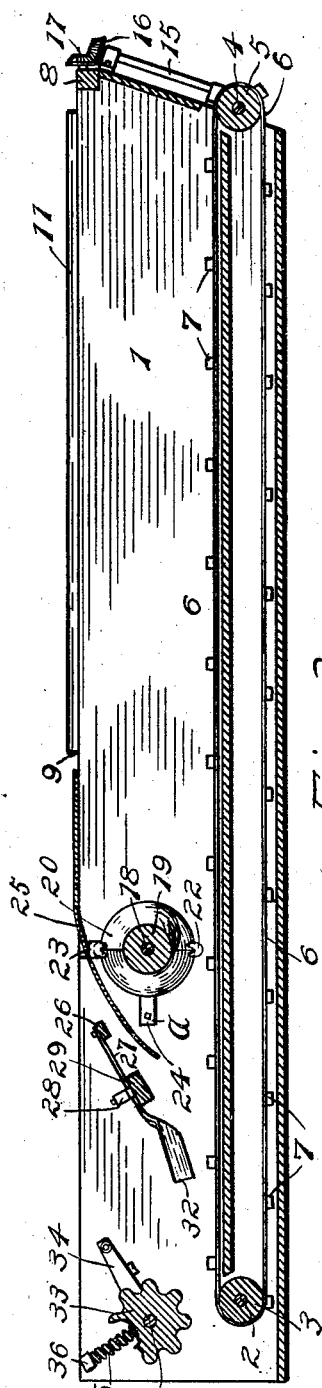

No. 785,398. Patented March 21, 1905.

UNITED STATES PATENT OFFICE.

CHARLES G. BORT, OF STERLING, ILLINOIS.

BAND-CUTTER AND FEEDER FOR CORN-SHREDDERS.

SPECIFICATION forming part of Letters Patent No. 785,398, dated March 21, 1905.

Application filed November 4, 1903. Serial No. 179,776.

*To all whom it may concern:*

Be it known that I, CHARLES G. BORT, a citizen of the United States, residing at Sterling, in the county of Whiteside and State of Illinois, have invented certain new and useful Improvements in Band-Cutters and Feeders for Corn-Shredders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to feed mechanism for corn-shredders; and it consists in the novel construction and arrangement of parts, which are hereinafter particularly described and pointed out.

In the drawings, Figure 1 is a plan view of my device with certain parts removed. Fig. 2 is a rear end elevation thereof. Fig. 3 is a vertical longitudinal section thereof. Fig. 4 is an enlarged view in detail of the spreading and cutting roll. Fig. 5 is a detailed perspective of one of the agitators. Fig. 6 is a detail view of a means for oscillating the bar to which the cutting-blades are pivoted.

1 represents the hopper or trough, into which the cornstalks are delivered from the wagons. This hopper is suitably supported by means not shown and attached to the end of the shredder, so that the stalks may pass from the hopper into the shredder. At that end of the hopper nearest the shredder is a rotary shaft 2, through which power is communicated by any usual means to the operating parts of the device. Seated on the shaft 2, so as to rotate therewith, is a roller 3. At the other end of the hopper 1 is a similar shaft 4, fixed on which is a roller 5. Supported on the rollers 3 and 5 is a continuous apron 6, to which movement is imparted from the roller 3, so that the upper layer of such apron moves in the direction of the shredder. By means of the apron the movement of the shaft 2 is communicated to the roller 5 and shaft 4. The apron 6 is provided with slats 7 or similar devices to aid in the movement of the cornstalks.

At each side of the hopper 1 is a frame 8, in each of which is mounted a pair of rollers 9 and 10, each pair of which supports a continuous apron 11, provided with slats 12. The rollers 9 are rotated, so as to move the aprons 11 toward the hopper, by the following means: On the ends of the shaft 4 are two bevel gear-wheels 13, meshing with two similar bevel gear-wheels 14 on the end of two vertical shafts 15, suitably supported on the rear end of the hopper 1. On the upper ends of the shafts 15 are two similar bevel gear-wheels 16, engaging two similar bevel gear-wheels on the ends of the rollers 9. The rotation of the shaft 4 is thus communicated, through the wheels 13, wheels 14, shafts 15, wheels 16, and wheels 17, to the rollers 9.

Transversely of the hopper 1 is a rotary shaft 18, upon which is fixed a roller 19. Secured to the periphery of the roller 19 is a double spiral 20, such spiral being disposed on said roller in both directions away from the center thereof, so as to operate to work the stalks toward the sides of the hopper. The spirals are formed of semicircular sections 21, Fig. 4, which are united at their points of junction by semicircular knives 22.

The shaft 18 extends at each end through slots 23 in the side of the hopper 1 (only one of such slots being shown) and is supported at each end in the end of an arm 24, pivoted on the inner side of the hopper, as at *a*.

25 is a downwardly-extending partition or hood to prevent injury on the knives 22 and also keep the stalks in contact with the apron 6.

In advance of the shaft 18 is a cross-bar 26, suitably mounted so as to oscillate transversely of the machine. Pivotally secured to the bar 26 is a plurality of agitators 27, each of which is supported in an arch 28, fixed on a cross-piece 29, rigidly secured at each end to the hopper 1. A bolt 30 passes downwardly from the arch 28 to the cross-piece 29 through a perforation in the agitator 27, and between such agitator and the top of the arch is interposed an extensile coiled spring 31. The lower ends of the agitators are bent downward, given a quarter turn, and formed into cutting-blades 32.

A corrugated roll 33 is supported at each end to swinging arms 34, pivotally secured to the sides of the hopper 1. The tendency of the roller to rise is resisted to some extent by a coiled spring 35, secured between a block 36 and the frame 34.

On one end of the shaft 2 is a pulley 37, by means of which rotation is imparted to the shaft 18 by a belt 38 and pulley 39 on such shaft. By means of the pulley 40 on the shaft 18, pulley 41, and belt 42 the rotation of the shaft 18 is imparted to the shaft 43, on which the roller 33 is fixed, and on the end of which shaft the pulley 41 is secured. On the opposite end of the shaft 43 from the pulley 41 is a miter-gear 44, engaging and actuating a miter-gear 45 on the end of a shaft 46, suitably journaled on the outside of the hopper 1. On the rear end of the shaft 46 is a disk 47, carrying a pin 48, which has play in a vertical slot 49 in the enlarged end 49' of the bar 26.

In operation the stalks are fed into the hopper from either side, the aprons 11 covering the space between the hopper and the wagon and preventing the downward passage of the stalks between the machine and the wagon—a common fault with similar devices now in use. Upon being received into the hopper the stalks are first introduced beneath the roller 19 by the mechanism on which two operations are simultaneously performed—namely, the bands on the bundles are cut by the knives 22 and the stalks are spread apart and toward the sides of the hopper by the spirals 20, the rotation of the shaft 18 being in direction of the feed of the stalks. After passing beyond the roller 19 the stalks are further spread apart by the agitators 27, to which an oscillating lateral movement is imparted from the bar 26, actuated by the shaft 46. By forming the lower ends of the agitators into the blades 32 any bands which may escape cutting by the knives 22 are severed by such blades. By the use of the arch 28 and the bolt spring therein each of the agitators is allowed a limited amount of vertical flexibility, so that they may rise upon the passage of material of greater thickness beneath the same. From the last-named devices the cornstalks pass between the roller 3 and roller 33 to the snapping-rolls of the shredder.

In the feeding of cornstalks to a shredder two of the chief ends to be attained are the positive cutting of the bands with which the bundles are secured and the spreading of the stalks as they are introduced to the machine. It will be seen that in my machine each of these operations is accomplished by double mechanism. For the severing of the bands the knives 22 are provided, and any bands which are missed by such knives are cut by the blades 32. The spreading of the stalks is accomplished partially by the spirals 20 and continued by the agitators 27. By this arrangement the danger of clogging or choking of the stalks is reduced to a minimum. It will also be seen that the construction of these duplicate mechanisms is greatly simplified by combining the cutting and spreading devices so that the four operations are performed by practically two mechanical parts.

The knives 22 are formed with a cutting edge in front and rear, so that if it is desired to reverse the mechanism on account of clogging of the stalks the cutting of the bands can be accomplished when the knives are moving rearwardly. By means of the shaft 18 being supported in vertical slots 23 such shaft is permitted to move vertically and accommodate itself to the varying thickness of the material passing beneath.

What I claim as my invention, and desire to secure by Letters Patent of the United States, is—

1. In a feed device for shredders, the combination of a hopper, an endless apron arranged in its lower portion and extending longitudinally thereof, a spreading-roller mounted for rotation above the apron, knives carried by said roller, a plurality of knives arranged to the rear of said roller and extending to a point adjacent the upper face of the apron, a curved partition extending from the upper portion of said roller toward the lower portions of said last-named knives, and a guide-roller mounted to the rear of said last-named knives and above said apron, substantially as and for the purpose specified.

2. In a feeder device for shredders, a frame or hopper in combination with a spreading-roller, a curved partition extending about a portion thereof, a fixed cross-piece and a reciprocating cross-bar arranged above said partition, a plurality of agitators pivotally secured to said cross-piece and cross-bar respectively, said agitators having their lower ends disposed below the partition, means for operating said cross-bar, and means for feeding the stalks to said roller.

3. In a feeder device for shredders, a frame or hopper having therein revolving spreading means provided with oppositely-disposed spirals, and a plurality of inclined oscillatory knives arranged in the rear thereof, cutters mounted on the spirals, and an inclined curved partition arranged between said spreading means and oscillatory knives, in combination with a conveyer arranged therebelow, and means for operating the knives and spreading means.

4. In a machine of the type set forth, a hopper having therein a fixed cross-bar, a plurality of inclined agitators, arches mounted on said cross-bar and through which the agitators project, bolts extending through said arches and agitators whereby the latter are pivoted, springs encircling the bolts and bearing on said agitators and arches respectively, and a reciprocating cross-bar to which the upper ends of said agitators are pivoted, in combination with means for operating said cross-bar.

In testimony whereof I affix my signature in presence of two witnesses.

CHARLES G. BORT.

Witnesses:
   CARRIE L. HASKELL,
   ROYAL S. PITTMAN.